US011436211B1

(12) United States Patent
Perianayagam et al.

(10) Patent No.: US 11,436,211 B1
(45) Date of Patent: Sep. 6, 2022

(54) RENAMING A DATABASE TABLE WITH MINIMIZED APPLICATION DOWNTIME

(71) Applicant: Amazon Technologies, Inc., Seattle, WA (US)

(72) Inventors: Somasundaram Perianayagam, Seattle, WA (US); Akshat Vig, Seattle, WA (US); Nicholas Gordon, Seattle, WA (US); Ravi Math, Redmond, WA (US); Divyank Duvedi, Seattle, WA (US); Chase Kernan, Seattle, WA (US); Elie Gharios, Marquette Lez Lille (FR); Robert Kenny, Kinvara (IE); Jeffrey John Wierer, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 19 days.

(21) Appl. No.: 17/037,493

(22) Filed: Sep. 29, 2020

(51) Int. Cl.
*G06F 16/22* (2019.01)
*G06F 16/23* (2019.01)
*G06F 16/25* (2019.01)
*G06F 16/21* (2019.01)

(52) U.S. Cl.
CPC ........ *G06F 16/2282* (2019.01); *G06F 16/213* (2019.01); *G06F 16/2386* (2019.01); *G06F 16/252* (2019.01)

(58) Field of Classification Search
None
See application file for complete search history.

(56) References Cited

U.S. PATENT DOCUMENTS

| | | | |
|---|---|---|---|
| 6,457,003 B1 | 9/2002 | Gajda et al. | |
| 7,478,112 B2 | 1/2009 | Dulay et al. | |
| 8,356,010 B2 | 1/2013 | Driesen | |
| 8,595,267 B2 * | 11/2013 | Sivasubramanian | ... H04L 67/02 707/972 |
| 9,460,142 B2 | 10/2016 | Mielenhausen | |
| 10,496,401 B2 | 12/2019 | Eberlein et al. | |
| 10,621,372 B2 | 4/2020 | Khimich et al. | |
| 10,642,803 B2 | 5/2020 | Nambiar et al. | |
| 2011/0004622 A1 * | 1/2011 | Marson | ................. G06Q 10/06 707/812 |

(Continued)

*Primary Examiner* — Kim T Nguyen
(74) *Attorney, Agent, or Firm* — Robert C. Kowert; Kowert, Hood, Munyon, Rankin & Goetzel, P.C.

(57) ABSTRACT

Methods, systems, and computer-readable media for renaming a database table with minimized application downtime are disclosed. A database receives a table rename request for a table having a first table name. Routing metadata comprises a mapping of the first table name to a table identifier and a mapping of the table identifier to one or more partitions. The table rename request indicates a second table name. The database generates updated routing metadata responsive to the table rename request. The updated routing metadata comprises a mapping of the second table name to the table identifier and the mapping of the table identifier to the one or more partitions. The database receives, from a client application, one or more access requests indicating the second table name. The database routes the one or more access requests to the one or more partitions based at least in part on the updated routing metadata.

20 Claims, 10 Drawing Sheets

(56) References Cited

U.S. PATENT DOCUMENTS

| | | | |
|---|---|---|---|
| 2013/0124466 A1* | 5/2013 | Naidu | G06F 16/27 |
| | | | 707/610 |
| 2015/0149509 A1* | 5/2015 | Leu | G06F 16/27 |
| | | | 707/803 |
| 2020/0089750 A1* | 3/2020 | Ros | G06F 40/149 |
| 2020/0117688 A1* | 4/2020 | Sequeda | G06F 16/367 |
| 2020/0201835 A1* | 6/2020 | Okamura | G06F 16/2282 |
| 2020/0201836 A1* | 6/2020 | Okamura | G06F 8/30 |
| 2021/0073196 A1* | 3/2021 | Schub | G06F 16/2282 |

\* cited by examiner

RENAMING A DATABASE TABLE WITH MINIMIZED APPLICATION DOWNTIME

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, such distributed systems may provide database systems to clients. As the scale and scope of database systems have increased, the tasks of provisioning, administering, and managing system resources have become increasingly complicated. For example, the costs to search, analyze, and otherwise manage data sets can increase with the size and scale of the data sets.

Figure 1A:
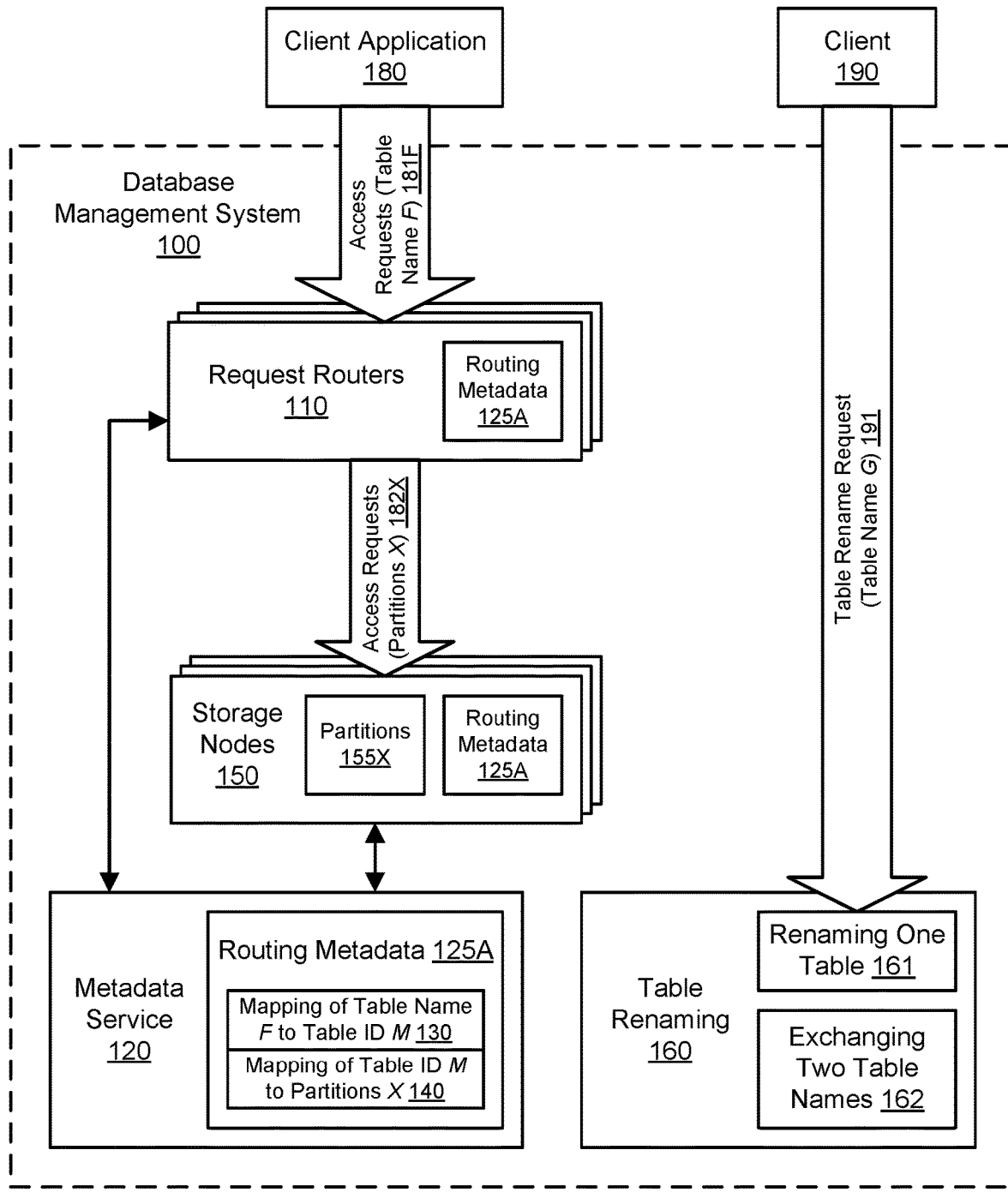
FIG. 1A, FIG. 1B, and FIG. 1C illustrate an example system environment for renaming a database table with minimized application downtime, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for renaming a database table with minimized application downtime are described. Database management systems (also referred to as databases) may be hosted in the cloud and may be accessible by clients via the Internet. Such databases may provide clients with access to collections of structured or unstructured data such as tables. A database table may represent a collection of items, and an item may represent a collection of attributes. A table may be assigned a table name, e.g., at creation of the table, and that name may be used to uniquely identify the collection of items in the table (e.g., within a client account or some other context). For example, an administrator or other user may assign a human-readable name to a table, and the name may reflect the contents of the table (e.g., "customer_addresses," "inventory", and so on). The client may then run an application or other software that accesses the table by name. At some point in the time, the client may seek to change the name of the table. However, in prior approaches for renaming tables, a table may be inaccessible to the client while the table name is changed within the database management system. Consequently, the client application may experience downtime. During this downtime, important systems at the client that rely on database access (e.g., an ordering system that requires access to customer addresses and/or up-to-date inventory data) may be unusable.

The aforementioned challenges, among others, are addressed by embodiments of the techniques described herein, whereby table names may be changed for one or more tables at a time in a database management system without necessarily causing application downtime. The database management system may use a client-facing (e.g., human-readable) table name as an alias to an internal table identifier (ID). Applications submitting access requests may specify this client-facing table name rather than the internal table ID. To change the name of a single table (e.g., where the new table name is not attached to an existing table), routing metadata at request routers and storage nodes may be quickly updated to map the new table name to the original table ID without necessarily making the table inaccessible to clients. The table ID may remain mapped to the same partitions, and subsequent access requests from a client application that specify the new table name may be properly routed to the partitions at the underlying storage nodes using the updated routing metadata. Table names may also be changed for two tables at a time, e.g., when a table is restored with a new table name such that the restored version exists alongside the unrestored version of the table with the original table name. To exchange table names between two existing tables (e.g., a restored version and an unrestored version of the same table), the routing metadata may be updated atomically to map the first table name to the second table ID and the second table name to the first table ID. Until updates are propagated to all of the request routers, access requests may be routed according to both the old routing metadata (at routers that have not yet been updated) and new routing metadata (at routers that have been updated). Table names may be associated with version numbers so that storage nodes can reject access requests that include outdated version numbers while the updated routing metadata is being propagated to all of the request routers.

As one skilled in the art will appreciate in light of this disclosure, embodiments may be capable of achieving certain technical advantages, including some or all of the following: (1) improving the availability of a database management system for read requests by keeping tables accessible while table names are changed; (2) improving the availability of a database management system for write requests by keeping tables accessible while table names are changed; (3) improving the availability of upstream systems and services that rely on database access by keeping tables accessible while table names are changed; (4) improving data integrity during table name changes by accepting or rejecting access requests at storage nodes according to table name version numbers; and so on.

Figure 1B:
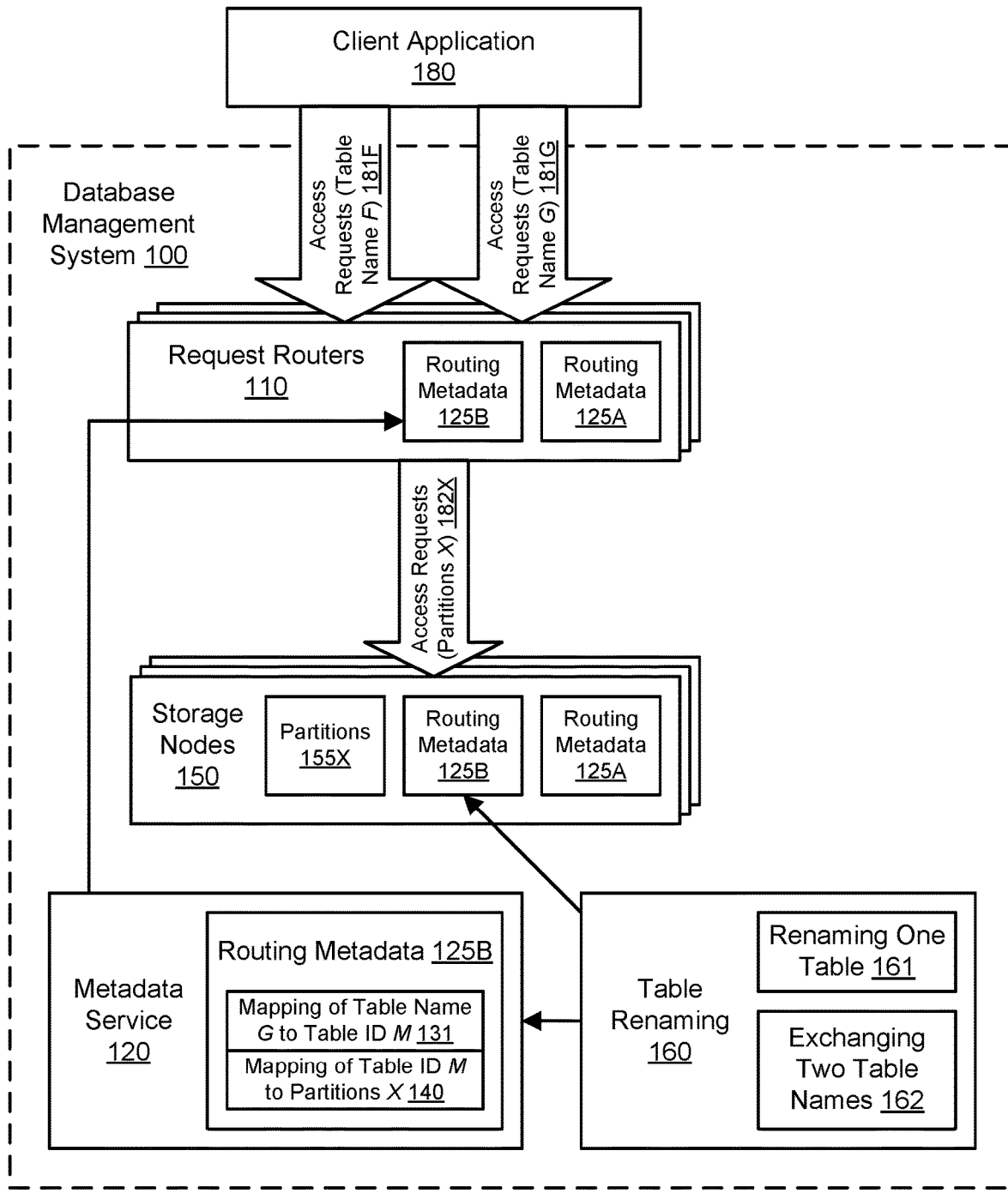
Figure 1C:
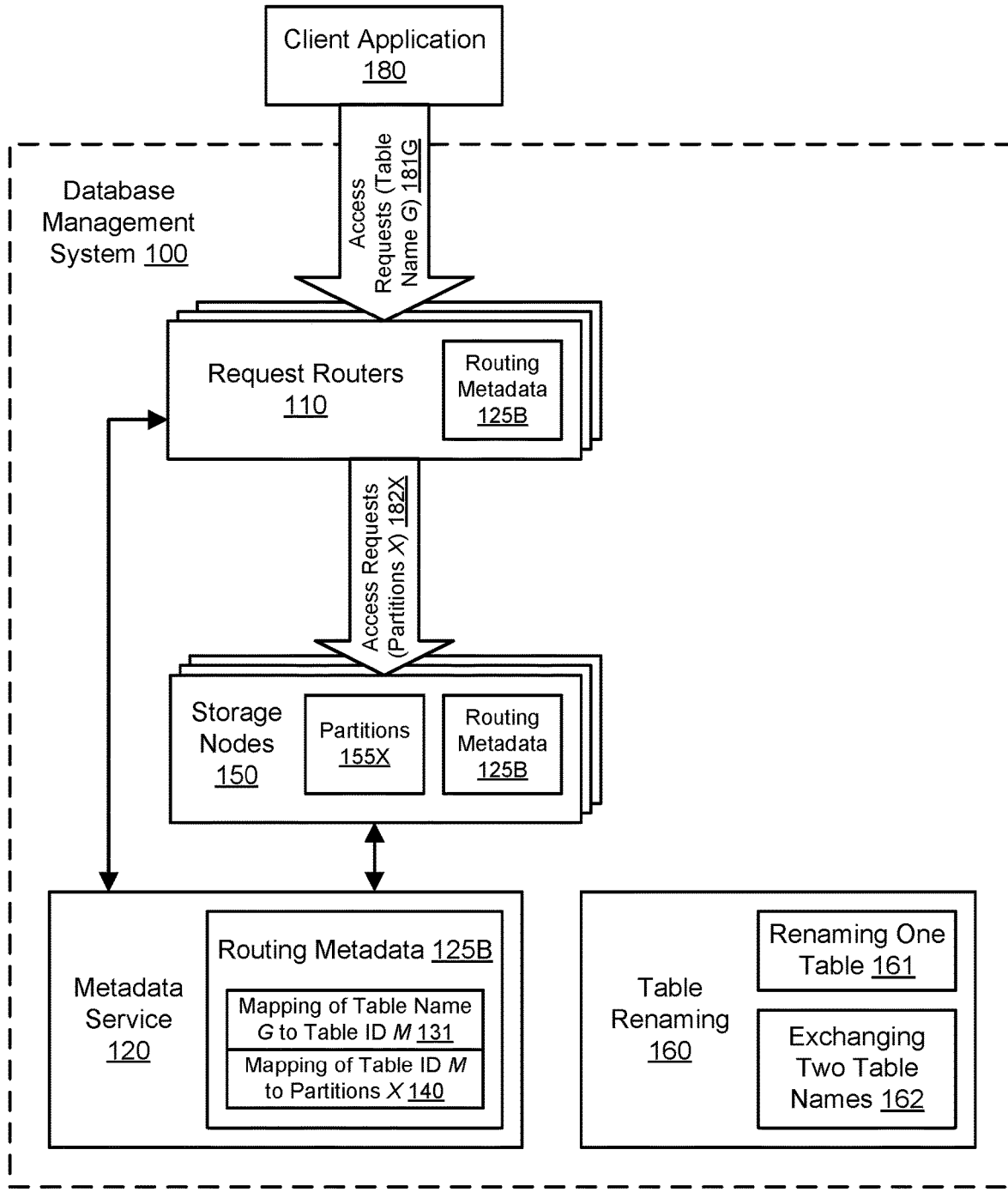

FIG. 1A, FIG. 1B, and FIG. 1C illustrate an example system environment for renaming a database table with minimized application downtime, according to some embodiments. A database management system 100 (also referred to as a database) may be hosted in the cloud and may be accessible by clients via one or more networks such as the Internet. The database management system 100 may provide clients with access to collections of structured or unstructured data such as tables. In some embodiments, the database management system 100 may provide access to a NoSQL database. A NoSQL database may store data in a non-tabular format such as documents, key-value pairs, wide columns, graphs, and so on. A NoSQL database may provide flexible schemas. A NoSQL database may provide the performance, scalability, and flexibility to support a variety of domains such as "big data" and real-time web applications.

In some embodiments, a database table maintained by the database management system 100 may represent a collection of items, and an item may represent a collection of attributes. The items in the table may be divided into a plurality of partitions such as partitions 155X. The partitions 155X may be stored using one or more storage nodes 150. In some embodiments, each partition may be replicated across the storage nodes 150 such that a given partition is stored using identical copies in different storage nodes. A table may be assigned a table name within the database management system 100, e.g., at creation of the table. The table name may be used to uniquely identify the collection of items in the table within a client account or some other context. For example, an administrator or other user associated with the client 190 may assign a human-readable name F to the table that includes partitions 155X.

FIG. 1A illustrates a state of the database management system 100 at a first point in time. The client may run an application 180 or other software that accesses the table by the table name F, e.g., by submitting access requests 181F that include, reference, specify, or otherwise indicate the table name F. The access requests 181F may represent requests to read data, write data, update data, delete data, and so on. In some embodiments, the access requests 181F may be sent by the client application 180 to a fleet of request routers 110 associated with the database management system 100. A particular request router may receive a particular access request and route it to the appropriate partitions according to routing metadata 125A. In some embodiments, the access requests 181F may be sent by the client application 180 to one or more load balancers associated with the database management system 100, and a particular load balancer may route a particular access request to a particular one of the request routers 110 that is selected by the load balancer. The request routers 110 may use the routing metadata 125A to route the access requests 182X to the partitions 155X based (at least in part) on the table name F indicated by the access requests 181F. The access requests 182X may then be performed at the storage nodes 150 that store the partitions 155X identified by the table name F. As will be discussed in greater detail below, access requests 182X may include version numbers or version identifiers associated with table names, and storage nodes 150 may reject access requests that include outdated version numbers to preserve data integrity.

In some embodiments, a metadata system or service 120 may manage the routing metadata for the database management system 100. The metadata service 120 may maintain routing metadata 125A for one or more tables. The routing metadata 125A may change over time, e.g., as tables are renamed. The metadata service 120 may act as an authoritative source for the most up-to-date routing metadata and may provide up-to-date routing metadata to the request routers 110. Individual request routers 110 may store copies of the routing metadata 125A, e.g., in cache memories. In some embodiments, the metadata service 120 may provide up-to-date routing metadata to the storage nodes 150. Individual storage nodes 150 may store copies of the routing metadata 125A, e.g., in cache memories. In some embodiments, the metadata service 120 may push routing metadata updates to the request routers 110 and/or storage nodes 150. In some embodiments, the request routers 110 and/or storage nodes 150 may pull routing metadata updates from the metadata service 120. For example, if a storage node rejects an access request with an outdated table name version, the storage node may inform the request router that the router should acquire the latest routing metadata from the metadata service 120 and then resubmit the access request with the latest table name version.

To facilitate low-latency table name changes, the database management system 100 may use a client-facing (e.g., human-readable) table name as an alias or indirection to an internal table identifier (ID). The routing metadata may reflect this aliasing or indirection. For example, the routing metadata 125A may include a mapping 130 of the table name F to a table IDM. The table IDM may be assigned by the database management system 100 at the time of creation of the table. The application 180 submitting access requests 181F may specify the client-facing table name F rather than the internal table ID M. In some embodiments, the application 180 may have no knowledge of the table ID M. The routing metadata 125A may also include a mapping 140 of the table ID M to the partitions X (e.g., partitions 155X) that are stored by the storage nodes 150.

The request routers 110 may use these mappings to route access requests from client applications to the appropriate storage nodes 150 that store partitions to which the access requests seek access. For example, when a particular one of the request routers 110 receives one of the requests 181F from the client application 180 (potentially via a load balancer), the router may determine that the request indicates the table name F. The particular router may ask the metadata service 120 for the relevant routing metadata 125A or may look up the relevant routing metadata 125A in a local cache. By referring to the routing metadata 125A, the particular router may determine that the table name F is mapped to the table ID M. By referring to the routing metadata 125A, the particular router may also determine that the table ID M is mapped to the partitions X. The particular router may then send the access request to the appropriate partition(s) 155X at the appropriate storage node(s) 150.

At some point in the time, the client 190 may seek to change the name F of the table. For example, the client 190 may decide that the table name F was created in error or that the table name F no longer accurately represents the contents of the table. As illustrated in FIG. 1A, the client 190 may represent a computing device associated with a client of the database management system 100 and/or the user that operates the device to interact with the database management system. To request a name change, the client 190 may submit a table rename request 191 to a table renaming component 160 of a control plane of the database management system 100. The table renaming component 160 may include one or more application programming interfaces (APIs) or other programmatic interfaces, one or more graphical user interfaces (GUIs), one or more command-line interfaces (CLIs), one or more voice-enabled interfaces, and so on. For example, as shown in FIG. 1A, the table renaming component 160 may include an API for renaming one table 161 and an API for exchanging two table names 162. In some embodiments, the same API may offer renaming one table 161 and exchanging two table names 162 but with different parameters or flags.

The table rename request 191 may include, reference, specify, or otherwise indicate a new table name G. In some embodiments, the new table name G may not currently be in use for another table within the client account or some other relevant context. Because the rename request 191 seeks to change the name of one table to a new table name that is not currently in use, the renaming one table functionality 161 may be used instead of the exchanging two table names functionality 162. As will be discussed below, to process the table rename request 191, the table renaming component 160 may update the routing metadata such that the table name G is mapped to the original table ID M.

FIG. 1B illustrates a state of the database management system 100 at a second point in time when the table rename request 191 is being processed such that updated routing metadata 125B is being propagated to the fleet of request routers 110. In some embodiments, the table renaming component 160 may generate updated routing metadata 125B to enact the name change. In some embodiments, the metadata service 120 may generate the updated routing metadata 125B to enact the name change. The updated routing metadata 125B may replace the mapping 130 of table name F to table IDM with a mapping 131 of the new table name G to the same table ID M. The updated routing metadata 125B may continue to include the mapping 140 of the table ID M to the partitions X (e.g., partitions 155X) that are stored by the storage nodes 150.

The updated routing metadata 125B may be propagated by the metadata service 120 to each of the request routers 110. The request routers 110 may use the updated routing metadata 125B to route access requests from client applications to the appropriate storage nodes 150 that store partitions to which the access requests seek access. For example, when a particular one of the request routers 110 receives one of the requests 181G from the client application 180 (potentially via a load balancer), the router may determine that the request indicates the table name G. The particular router may ask the metadata service 120 for the relevant routing metadata 125B or may look up the relevant routing metadata 125B in a local cache. By referring to the routing metadata 125B, the particular router may determine that the table name G is mapped to the table ID M. By referring to the routing metadata 125B, the particular router may also determine that the table ID M is mapped to the partitions X. The particular router may then send the access request to the appropriate partition(s) 155X at the appropriate storage node(s) 150.

Different ones of the request routers 110 may receive the updated routing metadata 125B at different times. In some embodiments, the updated routing metadata 125B may be propagated by the table renaming component 160 of the control plane or by the metadata service 120 to each of the storage nodes 150. In some embodiments, the updated routing metadata 125B may be pushed to the storage nodes 150 using a replication request. The replication request may be sent by the table renaming component 160 or the metadata service 120. In some embodiments, the routing metadata may instead be decoupled from the storage nodes 150.

In some embodiments, while the updated routing metadata 125B is being propagated to each of the request routers 110 individually, some request routers may cache and use the old routing metadata 125A while other request routers may cache and use the new routing metadata 125B. Similarly, in some embodiments, while the updated routing metadata 125B is being propagated to each of the storage nodes 150, some storage nodes may cache and use the old routing metadata 125A while other storage nodes may cache and use the new routing metadata 125B. During this intermediate stage of the table renaming process, requests 181F and 181G may be concurrently processed by the request router fleet 110 by routers with different versions of the routing metadata 125A-125B. In some embodiments, until the entire router fleet is updated, the client application 180 may continue to provide access requests 181F that indicate the old table name F while also providing access requests 181G that indicate the new table name G. The temporary ability of the router fleet 110 to route access requests with both the old name F and the new name G may facilitate the uninterrupted use of the database 100 with no or minimal application downtime.

FIG. 1C illustrates a state of the database management system 100 at a third point in time when the name change is complete. At some point in time, the updated routing metadata 125B may be propagated to the entire fleet of request routers 110 and the entire set of storage nodes 150. At that time, only the access requests 181G indicating the table name G may be routed to the partitions 155X associated with that table. In some embodiments, the renamed table may exist across different regions of a cloud provider network. A table rename operation may be performed for each region in which a version of the table is maintained. In some embodiments, until the multi-region table rename operation is completed in every region, the state shown in FIG. 1B may be maintained.

In some embodiments, the table renaming component 160 or another control plane component may also change the table name in one or more additional locations. For example, the table name may be changed from F to G in one or more backups, one or more identity and access management policies, one or more cloud-based alarm systems, one or more cloud-based metric systems, one or more streams of table updates to subscribers, one or more indices, one or more other services external to the database management system 100, and so on. The table name may be changed in the one or more additional locations using a process that is both atomic and isolated.

In one embodiment, one or more components of the database 100, such as request routers 110, the metadata service 120, the storage nodes 150, and/or the table renaming component 160, may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture to provide the functionality and resources of the system 100. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the database 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. The provider network may be hosted in the cloud and may be termed a cloud provider network. In one embodiment, portions of the functionality of the provider network, such as the database 100, may be offered to clients in exchange for fees.

Figure 6:
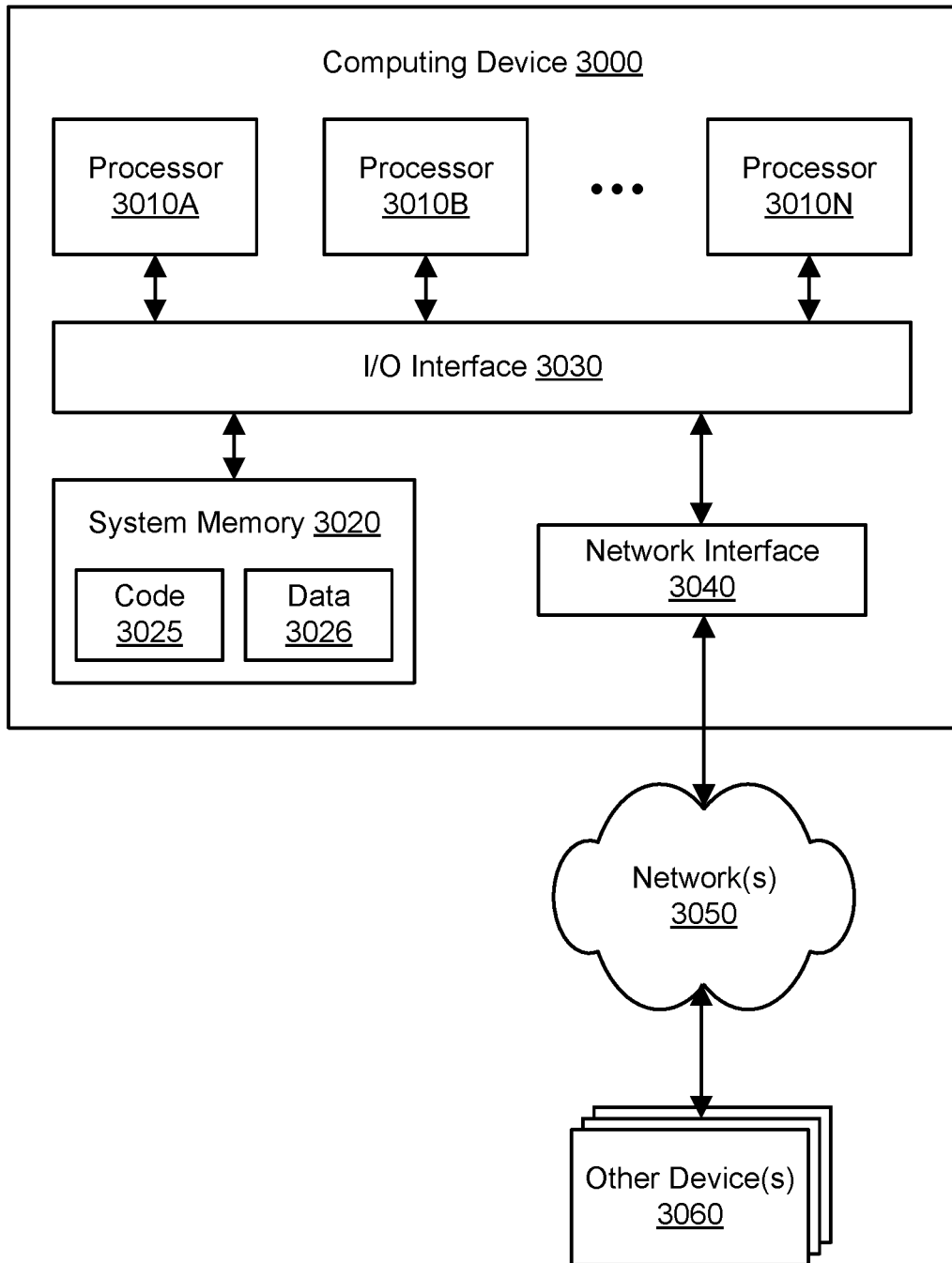
FIG. 6 illustrates an example computing device that may be used in some embodiments.

In various embodiments, components of the system 100, such as the request routers 110, the metadata service 120, the storage nodes 150, and/or the table renaming component 160, may be implemented using any suitable number and configuration of computing devices, any of which may be implemented by the example computing device 3000 illustrated in FIG. 6. In some embodiments, the computing devices may be located in any suitable number of data centers or geographical locations. In various embodiments, at least some of the functionality of the database 100 may be provided by the same computing device or by different computing devices. In various embodiments, if any of the components of the database 100 are implemented using different computing devices, then the components and their respective computing devices may be communicatively coupled, e.g., via one or more networks. Any of the components of the database 100 may represent any combination of software and hardware usable to perform their respective functions. In some embodiments, operations implemented by the database 100 may be performed automatically, e.g., without a need for user initiation or user intervention after an initial configuration stage, and/or programmatically, e.g., by execution of program instructions on at least one computing device. In some embodiments, the database 100 may include additional components not shown, fewer components than shown, or different combinations, configurations, or quantities of the components shown.

Clients 190 of the database 100 may represent external devices, systems, or entities with respect to the database. The client application 180 may run on such a device. Client devices 190 may be managed or owned by one or more customers of the database 100. In one embodiment, the client devices may be implemented using any suitable number and configuration of computing devices, any of which may be implemented by the example computing device 3000 illustrated in FIG. 6. Clients 190 may convey network-based service requests to the request router fleet 110 via one or more networks, e.g., to add or update data for storage using the storage nodes 150 or to read data from the storage nodes. The network(s) may encompass any suitable combination of networking hardware and protocols necessary to establish network-based communications between client devices and the database 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the database 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the database 100. In one embodiment, client devices may communicate with the database 100 using a private network rather than the public Internet. In various embodiments, the various components of the database 100 may also communicate with other components of the database using one or more network interconnects.

Figure 2:
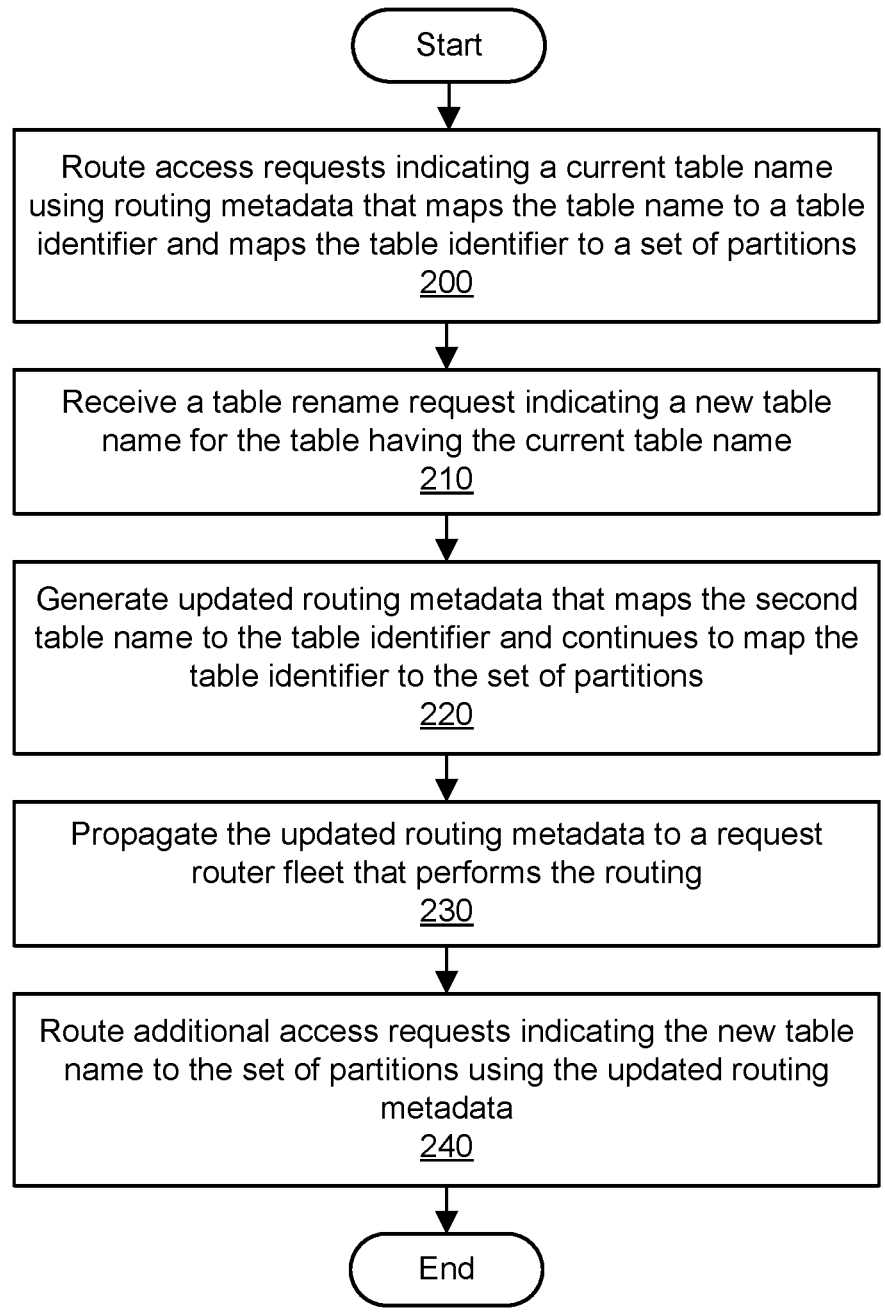
FIG. 2 is a flowchart illustrating a method for renaming a database table with minimized application downtime, according to some embodiments.

FIG. 2 is a flowchart illustrating a method for renaming a database table with minimized application downtime, according to some embodiments. As shown in 200, access requests that indicate a current table name may be routed to partitions using routing metadata. To facilitate low-latency table name changes, a database management system may use a client-facing (e.g., human-readable) table name as an alias or indirection to an internal table identifier (ID). The routing metadata may map the table name to a table identifier and map the table identifier to a set of partitions in which table data is stored. The access requests may represent requests to read data, write data, update data, delete data, and so on. In some embodiments, the access requests may be sent by a client application to a fleet of request routers associated with a database management system. A particular request router may receive a particular access request and route it to the appropriate partitions according to routing metadata. In some embodiments, the access requests may be sent by the client application to one or more load balancers associated with the database management system, and a particular load balancer may route a particular access request to a particular one of the request routers that is selected by the load balancer. A metadata service may act as an authoritative source for the most up-to-date routing metadata and may provide up-to-date routing metadata to the request routers. Individual request routers may store copies of the routing metadata, e.g., in cache memories.

As shown in 210, a table rename request may be received. For example, a client may decide that the current table name was created in error or that the current table name no longer accurately represents the contents of the table. The table rename request may indicate a new table name for the table having the current table name. In some embodiments, the new table name may not currently be in use for another table within the client account or some other relevant context. The table rename request may be submitted via an application programming interface (API) to a component of the database management system.

As shown in 220, updated routing metadata may be generated to enact the requested name change. The updated routing metadata may map the new table name to the original table identifier instead of mapping the old table name to the table identifier. The updated routing metadata may continue to map the table identifier to the set of partitions. As shown in 230, the updated routing metadata may be propagated to a request router fleet that performs the routing. Different ones of the request routers may receive the updated routing metadata at different times.

As shown in 240, additional access requests that indicate the new table name may be routed to the partitions using the updated routing metadata. The additional access requests may represent requests to read data, write data, update data, delete data, and so on. In some embodiments, the additional access requests may be sent by a client application to the fleet of request routers associated with a database management system. A particular request router may receive an additional access request and route it to the appropriate partitions according to the updated routing metadata. In some embodiments, while the updated routing metadata is being propagated to each of the request routers individually, some request routers may cache and use the old routing metadata while other request routers may cache and use the new routing metadata. During this intermediate stage of the table renaming process, requests with either table name may be concurrently processed by the request router fleet by routers with different versions of the routing metadata. The temporary ability of the router fleet to route access requests with both the old name and the new name may facilitate the uninterrupted use of the database with no or minimal application downtime.

Figure 3A:
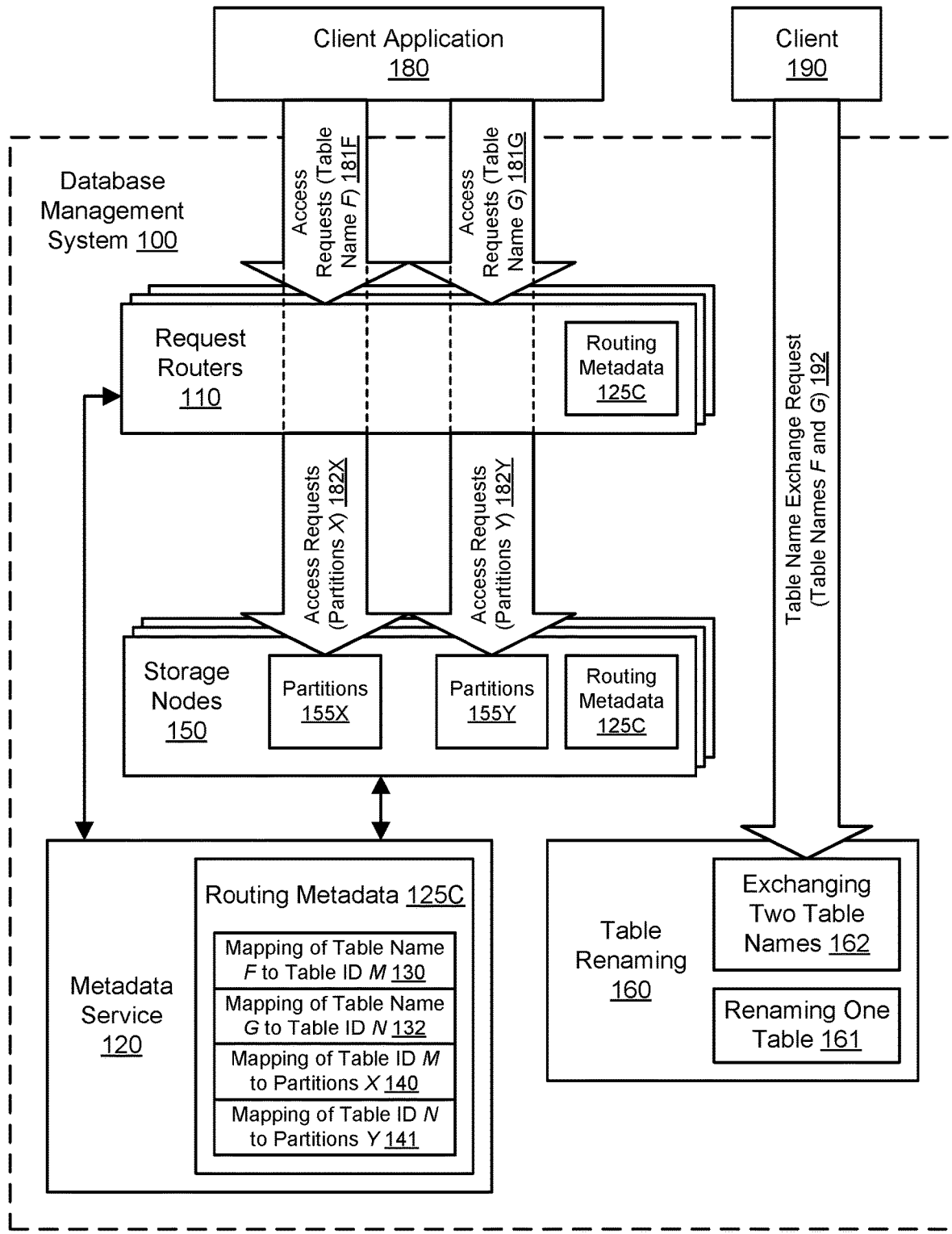
FIG. 3A, FIG. 3B, and FIG. 3C illustrate further aspects of the example system environment for renaming a database table with minimized application downtime, including a table name exchange between two tables, according to some embodiments.
Figure 3B:
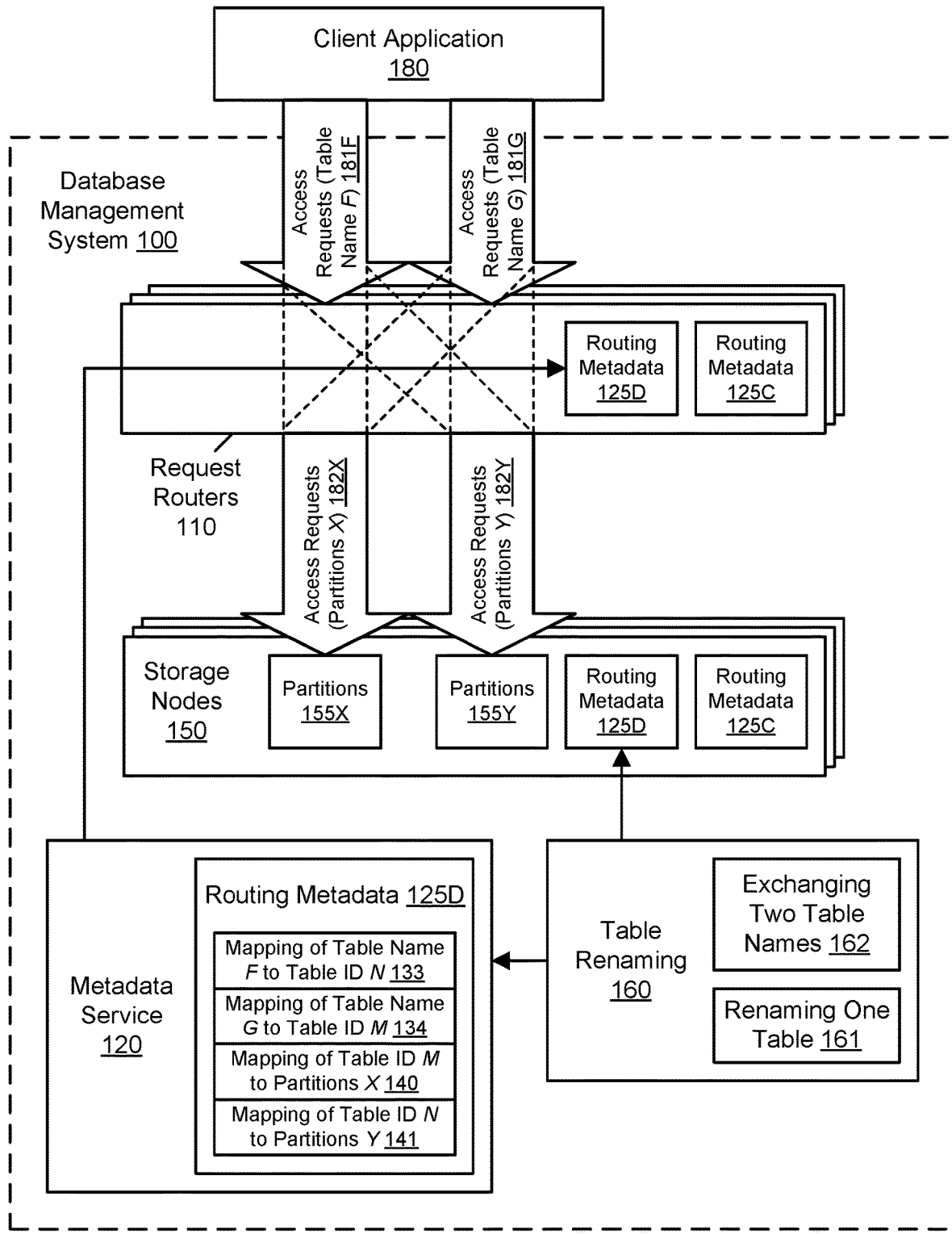
Figure 3C:
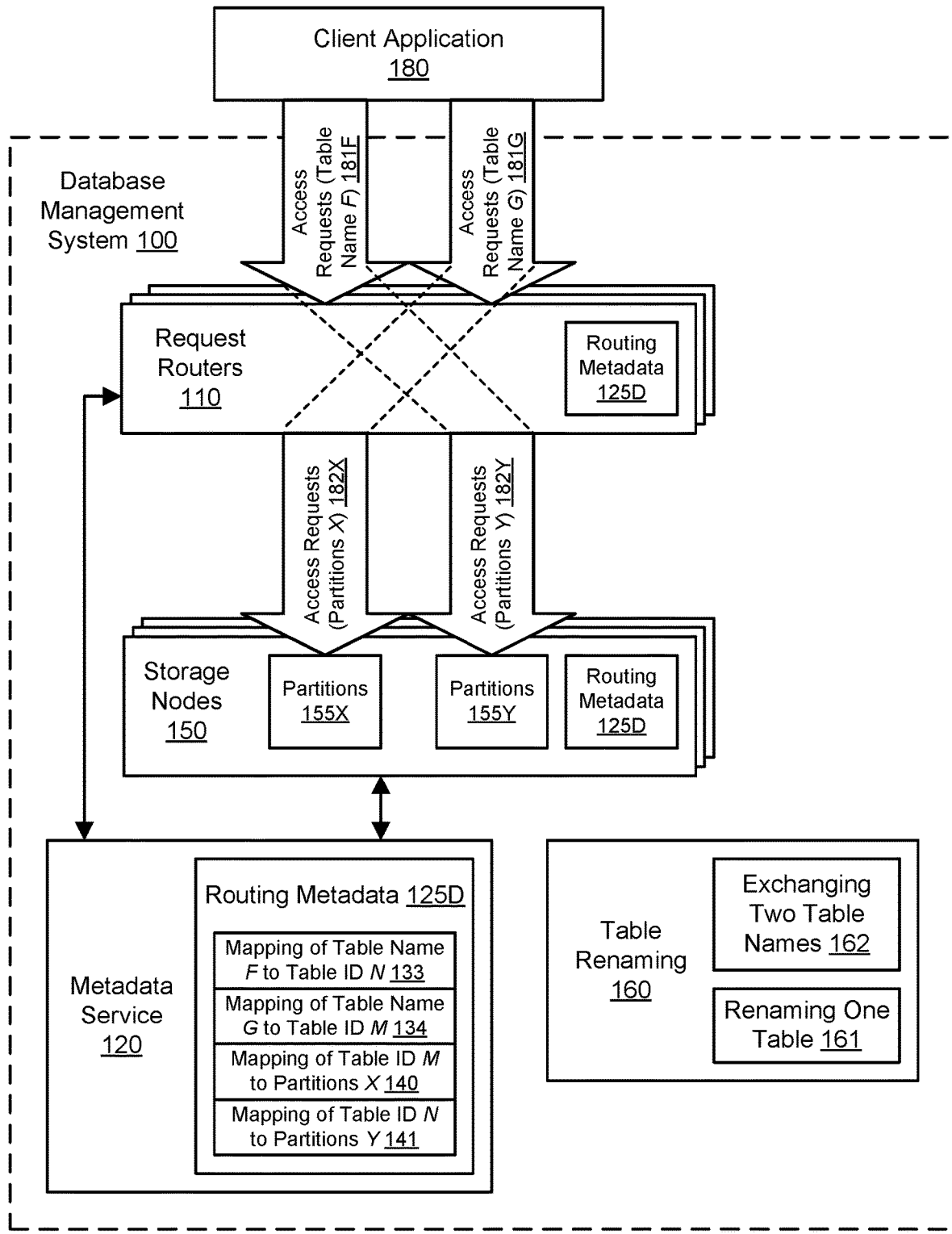

FIG. 3A, FIG. 3B, and FIG. 3C illustrate further aspects of the example system environment for renaming a database table with minimized application downtime, including a table name exchange between two tables, according to some embodiments. Using the functionality for exchanging two table names 162, table names may be changed for two tables at a time. For example, the client 190 may determine that a table has experienced logical corruption such that portions of the data are no longer usable. The client 190 may determine the point in time at which the table was corrupted. The client 190 may restore the table to an earlier point in time. In some embodiments, the client 190 may perform the restoration by taking a snapshot of the table from the earlier point in time and applying updates from an update log before the corruption occurred. In some embodiments, this table restoration may result in a restored version of table existing in the database 100 alongside the unrestored version of the table. For example, as shown in FIG. 3A, the unrestored version of the table may have a table name F and may be stored using partitions 155X. Meanwhile, the restored version of the table may have a different table name G and may be stored using partitions 155Y. In some embodiments, the restored version of the table may be created under the different table name G because the table name F is already in use by the unrestored version.

As discussed above, to facilitate low-latency table name changes, the database management system 100 may use a client-facing (e.g., human-readable) table name as an alias or indirection to an internal table identifier (ID). In the example shown in FIG. 3A, the routing metadata 125C may include the mapping 130 of the table name F to the table ID M The table ID M may be assigned by the database management system 100 at the time of creation of the original and restored version of the table. An application 180 submitting access requests 181F may specify the client-facing table name F rather than the internal table ID M. In some embodiments, the application 180 may have no knowledge of the table ID M. The routing metadata 125A may also include a mapping 140 of the table ID M to the partitions X (e.g., partitions 155X) that represent the unrestored version of the table. In the example shown in FIG. 3A, the routing metadata 125C may also include a mapping 132 of the table name G to a table ID N. The table ID N may be assigned by the database management system 100 at the time of creation of the restored version of the table. An application 180 submitting access requests 181G may specify the client-facing table name G rather than the internal table ID N. In some embodiments, the application 180 may have no knowledge of the table ID N. The routing metadata 125C may also include a mapping 141 of the table ID N to the partitions Y (e.g., partitions 155Y) that represent the restored version of the table.

The request routers 110 may use these mappings to route access requests from client applications to the appropriate storage nodes 150 that store partitions to which the access requests seek access. As shown in FIG. 3A, when a particular one of the request routers 110 receives one of the requests 181F from the client application 180 (potentially via a load balancer), the router may determine that the request indicates the table name F. The particular router may ask the metadata service 120 for the relevant routing metadata 125C or may look up the relevant routing metadata 125C in a local cache. By referring to the routing metadata 125C, the particular router may determine that the table name F is mapped to the table ID M. By referring to the routing metadata 125C, the particular router may also determine that the table ID M is mapped to the partitions X. The particular router may then send the access request to the appropriate partition(s) 155X at the appropriate storage node(s) 150. As shown in FIG. 3A, when a particular one of the request routers 110 receives one of the requests 181G from the client application 180 (potentially via a load balancer), the router may determine that the request indicates the table name G. The particular router may ask the metadata service 120 for the relevant routing metadata 125C or may look up the relevant routing metadata 125C in a local cache. By referring to the routing metadata 125C, the particular router may determine that the table name G is mapped to the table ID N. By referring to the routing metadata 125C, the particular router may also determine that the table ID N is mapped to the partitions Y. The particular router may then send the access request to the appropriate partition(s) 155Y at the appropriate storage node(s) 150.

At some point in the time, the client 190 may seek to swap the names F and G of the table. For example, after the restored version of the table has been added under the new name G because the original name F was in use for the unrestored version, the client 190 may seek to take the restored version online under the original name F. To request a name change for the two tables F and G at the same time, the client 190 may submit a table name exchange request 192 to the table renaming component 160 of the database management system 100. As discussed above, the table renaming component 160 may include one or more application programming interfaces (APIs) or other programmatic interfaces, one or more graphical user interfaces (GUIs), one or more command-line interfaces (CLIs), one or more voice-enabled interfaces, and so on. For example, as shown in FIG. 3A, the table renaming component 160 may include an API for renaming one table 161 and an API for exchanging two table names 162. In some embodiments, the same API may offer renaming one table 161 and exchanging two table names 162 but with different parameters or flags. In some embodiments, the exchanging two table names functionality 162 may be offered as an automated feature of one or more other operations. For example, a database administrator may choose to roll over a table name from one table to another on a routine basis. As a further example, a new table may be automatically created every month to be accessed under a standard name (e.g., "data current month")

while the previous month's table name is automatically changed to reflect its specific time period (e.g., "data_2020_july").

The table name exchange request 192 may include, reference, specify, or otherwise indicate the table names F and G to be swapped. Because the request 192 seeks to change the name of one table to a table name that is currently in use, the exchanging two table names functionality 162 may be used instead of the renaming one table functionality 161. As will be discussed below, to process the table name exchange request 192, the table renaming component 160 may update the routing metadata such that the new table name G is mapped to the original table ID M and the old table name F is mapped to the new table ID N.

FIG. 3B illustrates a state of the database management system 100 at a second point in time when the table name exchange request 192 is being processed such that updated routing metadata 125D is being propagated to the fleet of request routers 110. In some embodiments, the table renaming component 160 may generate updated routing metadata 125D to enact the name swap. In some embodiments, the metadata service 120 may generate the updated routing metadata 125D to enact the name change. The updated routing metadata 25D may be generated atomically such that both table names are remapped to different table IDs at the same time. The updated routing metadata 125D may replace the mapping 130 of the original table name F to the original table IDM with a mapping 133 of the table name F to the new table ID N. The updated routing metadata 125D may continue to include the mapping 141 of the new table ID N to the partitions Y (e.g., partitions 155Y) that represent the restored version of the table. The updated routing metadata 125D may replace the mapping 130 of the new table name G to the new table ID N with a mapping 131 of the table name G to the original table ID M. The updated routing metadata 125B may continue to include the mapping 140 of the original table ID M to the partitions X (e.g., partitions 155X) that represent the unrestored version of the table.

The updated routing metadata 125D may be propagated by the metadata service 120 to each of the request routers 110. The request routers 110 may use the updated routing metadata 125D to route access requests from client applications to the appropriate storage nodes 150 that store partitions to which the access requests seek access. As shown in FIG. 3B, when a particular one of the request routers 110 receives one of the requests 181F from the client application 180 (potentially via a load balancer), the router may determine that the request indicates the table name F. The particular router may ask the metadata service 120 for the relevant routing metadata 125D or may look up the relevant routing metadata 125D in a local cache. By referring to the routing metadata 125D, the particular router may determine that the table name F is mapped to the table ID N. By referring to the routing metadata 125D, the particular router may also determine that the table ID N is mapped to the partitions Y. The particular router may then send the access request to the appropriate partition(s) 155Y at the appropriate storage node(s) 150.

Similarly, as shown in FIG. 3B, when a particular one of the request routers 110 receives one of the requests 181G from the client application 180 (potentially via a load balancer), the router may determine that the request indicates the table name G. The particular router may ask the metadata service 120 for the relevant routing metadata 125D or may look up the relevant routing metadata 125D in a local cache. By referring to the routing metadata 125D, the particular router may determine that the table name G is mapped to the table ID M. By referring to the routing metadata 125D, the particular router may also determine that the table ID M is mapped to the partitions X. The particular router may then send the access request to the appropriate partition(s) 155X at the appropriate storage node(s) 150.

Different ones of the request routers 110 may receive the updated routing metadata 125D at different times. In some embodiments, the updated routing metadata 125D may be propagated by the metadata service 120 to each of the storage nodes 150. In some embodiments, the updated routing metadata 125D may be pushed to the storage nodes 150 using a replication request. The replication request may be sent by the table renaming component 160 or the metadata service 120. In some embodiments, while the updated routing metadata 125D is being propagated to each of the request routers 110 individually, some request routers may cache and use the old routing metadata 125C while other request routers may cache and use the new routing metadata 125D. Similarly, in some embodiments, while the updated routing metadata 125D is being propagated to each of the storage nodes 150, some storage nodes may cache and use the old routing metadata 125C while other storage nodes may cache and use the new routing metadata 125D.

During this intermediate stage of the table renaming process, requests 181F and 181G may be concurrently processed by the request router fleet 110 by routers with different versions of the routing metadata 125C-125D. As shown in the example of FIG. 3B, one of the access requests 181F may be routed to either the partitions 155X or partitions 155Y dependent upon whether the particular request router has the older routing metadata 125C or the newer routing metadata 125D. Similarly, one of the access requests 181G may be routed to either the partitions 155Y or partitions 155X dependent upon whether the particular request router has the older routing metadata 125C or the newer routing metadata 125D. The temporary ability of the router fleet 110 to route access requests with both the old name F and the new name G may facilitate the uninterrupted use of the database 100. To preserve data integrity, a storage node may accept or reject access requests according to a comparison of the table name version number of a request to the table name version number stored by the storage node. The use of table name versioning is discussed below with respect to FIG. 4.

FIG. 3C illustrates a state of the database management system 100 at a third point in time when the name exchange is complete. At some point in time, the updated routing metadata 125D may be propagated to the entire fleet of request routers 110 and the entire set of storage nodes 150. At that time, the access requests 181G indicating the newer table name G may be routed to the partitions 155X associated with the unrestored version of the table, while the access requests 181F indicating the older table name F may be routed to the partitions 155Y associated with the restored version of the table.

In some embodiments, the table renaming component 160 or another control plane component may also exchange the table names in one or more additional locations. For example, the table names may be exchanged in one or more backups, one or more identity and access management policies, one or more cloud-based alarm systems, one or more cloud-based metric systems, one or more streams of table updates to subscribers, one or more indices, one or more other services external to the database management system 100, and so on. The table names may be exchanged in the one or more additional locations using a process that is both atomic and isolated.

Figure 4:
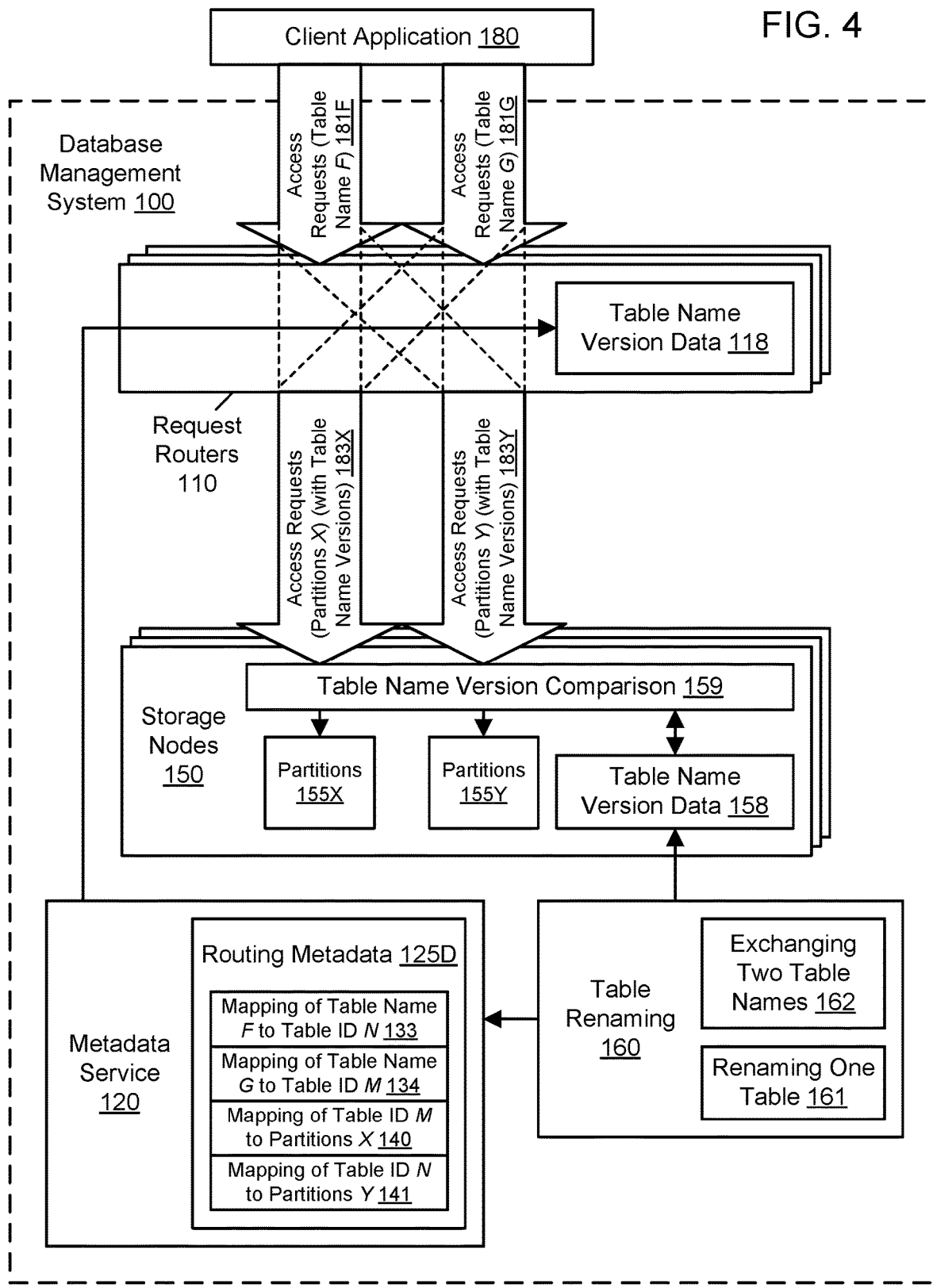
FIG. 4 illustrates further aspects of the example system environment for renaming a database table with minimized application downtime, including a comparison of table name versions at storage nodes, according to some embodiments.

FIG. 4 illustrates further aspects of the example system environment for renaming a database table with minimized application downtime, including a comparison of table name versions at storage nodes, according to some embodiments. As discussed above, access requests may include version numbers or version identifiers associated with table names, and storage nodes 150 may reject access requests that include outdated version numbers to preserve data integrity. In some embodiments, a table name for a particular table may be associated with a version number. When the table name is changed for that table, the version number may be increased. For example, if the table name F is changed to the table name G for the table including the partitions 155X, then the table name version number for that table may be incremented from 1 to 2. As another example, if the table name G is changed to the table name F for the table including the partitions 155Y, then the table name version number for that table may be incremented from 1 to 2. The table name version numbers may be associated with different versions of the routing metadata. For example, routing metadata 125C may be associated with version 1 for both tables, while routing metadata 125D may be associated with version 2 for both tables.

The table name version data may be propagated to the request routers 110 and storage nodes 150 along with the updated routing metadata. As shown in FIG. 4, request routers 110 may store table name version data 118, and storage nodes 150 may store table name version data 158. Because the updated routing metadata 125D may be received by different request routers at different times, one request router may have version number 1 (and the older routing metadata 125C) concurrently with another request router having version number 2 (and the newer routing metadata 125D).

To preserve data integrity during a name chance, the version numbers may be included in access requests routed to a storage node and used by the storage node for a table name version comparison 159 against the local version number at the particular storage node. For example, when a request router routes an access request to one or more storage nodes that store partitions 155X, the router may tag the request 183X with the table name version number from the table name version data 118. As another example, when a request router routes an access request to one or more storage nodes that store partitions 155Y, the router may tag the request 183Y with the table name version number from the table name version data 118. In some embodiments, if the version number in the request is older than the version number at the storage node (as determined using the local table name version data 158), then the storage node may reject the request. In some embodiments, if the version number in the request is the same as the version number at the storage node, then the storage node may accept the request. In some embodiments, if the version number in the request is newer than the version number at the storage node, then the storage node may reject the request. However, it is expected that the storage nodes may tend to have newer versions of the routing metadata before the request routers.

In some embodiments, the request routers 110 and/or storage nodes 150 may pull routing metadata updates from the metadata service 120. For example, if a storage node rejects an access request due to an older table name version, the storage node may inform the request router that the router should acquire the latest routing metadata from the metadata service 120 and try again. The router may acquire the updated routing metadata and resubmit the access request with the latest table name version. The resubmitted access request may then be accepted by the storage node.

Figure 5:
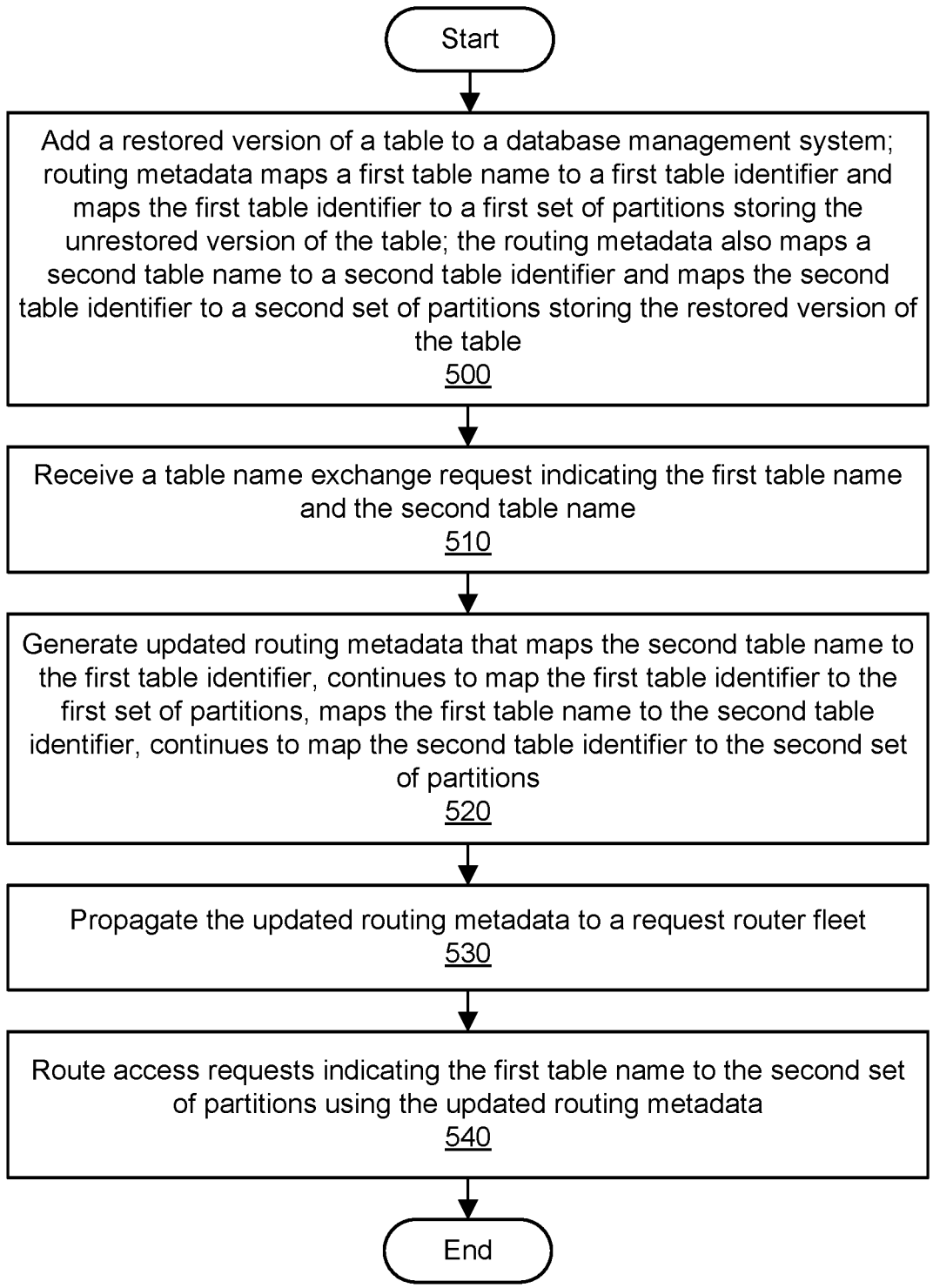
FIG. 5 is a flowchart illustrating a method for renaming a database table with minimized application downtime, including a table name exchange between two tables, according to some embodiments.

FIG. 5 is a flowchart illustrating a method for renaming a database table with minimized application downtime, including a table name exchange between two tables, according to some embodiments. As shown in 500, a restored version of a table may be added to a database management system. For example, a client may determine that a table has experienced logical corruption such that portions of the data are no longer usable. The client may determine the point in time at which the table was corrupted. The client may restore the table to an earlier point in time. In some embodiments, the client may perform the restoration by taking a snapshot of the table from the earlier point in time and applying updates from an update log before the corruption occurred. In some embodiments, this table restoration may result in a restored version of table existing in the database alongside the unrestored version of the table. In some embodiments, the restored version of the table may be created under a different table name because the original table name is already in use by the unrestored version.

To facilitate low-latency table name changes, a database management system may use a client-facing (e.g., human-readable) table name as an alias or indirection to an internal table identifier (ID). Routing metadata may map the first (e.g., unrestored) table name to a first table identifier and map the first table identifier to a first set of partitions in which the unrestored version of the table is stored. Routing metadata may also map the second (e.g., restored) table name to a second table identifier and map the second table identifier to a second set of partitions in which the restored version of the table is stored. A fleet of request routers may use these mappings to route access requests from client applications to the appropriate storage nodes that store partitions to which the access requests seek access.

As shown in 510, a table name exchange request may be received by the database management system. For example, after the restored version of the table has been added under the new name because the original name was in use for the unrestored version, the client may seek to take the restored version online under the original name. The table name exchange request may include, reference, specify, or otherwise indicate the table names to be swapped.

As shown in 520, updated routing metadata may be generated to enact the requested name exchange. The updated routing metadata may map the new table name to the original table identifier and may also map the original table name to the new table identifier. The updated routing metadata may continue to map the table identifiers to the same partitions. As shown in 530, the updated routing metadata may be propagated to the request router fleet. Different ones of the request routers may receive the updated routing metadata at different times. A metadata service may act as an authoritative source for the most up-to-date routing metadata and may provide up-to-date routing metadata to the request routers. Individual request routers may store copies of the routing metadata, e.g., in cache memories.

As shown in 540, additional access requests for the new table name and/or original table name may be routed to the appropriate partitions using the updated routing metadata. For example, access requests indicating the first or original table name may be mapped to the new table identifier and routed to the storage nodes storing the partitions that represent the restored version of the table. The additional access requests may represent requests to read data, write data, update data, delete data, and so on. In some embodiments, while the updated routing metadata is being propagated to each of the request routers individually, some request routers may cache and use the old routing metadata while other request routers may cache and use the new routing metadata. During this intermediate stage of the table renaming process, requests with either table name may be concurrently processed by the request router fleet by routers with different versions of the routing metadata. To preserve data integrity during this intermediate stage, a storage node may accept or reject access requests according to a comparison of the table name version number of a request to the table name version number stored by the storage node. The temporary ability of the router fleet to route access requests with both the old name and the new name may facilitate the uninterrupted use of the database with no or minimal application downtime.

Illustrative Computer System

In at least some embodiments, a computer system that implements a portion or all of one or more of the technologies described herein may include a computer system that includes or is configured to access one or more computer-readable media. FIG. 6 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or nonvolatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 6 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a database management system comprising a plurality of storage nodes, one or more processors, and one or more memories to store computer-executable instructions that, when executed, cause the one or more processors to:
   store routing metadata, wherein the routing metadata comprises a mapping of a first client-facing table name for a table to an internal table identifier for the table and a mapping of the internal table identifier to the one or more partitions associated with the table, and wherein the one or more partitions are stored using the plurality of storage nodes;
   receive, from a client application, one or more access requests indicating the first client-facing table name;
   route the one or more access requests to the one or more partitions based at least in part on the routing metadata;
   receive a table rename request indicating a second client-facing table name;
   generate updated routing metadata responsive to the table rename request, wherein the updated routing metadata comprises a mapping of the second client-facing table name to the internal table identifier and the mapping of the internal table identifier to the one or more partitions associated with the table;
   receive, from the client application, one or more additional access requests indicating the second client-facing table name; and
   route the one or more additional access requests to the one or more partitions based at least in part on the updated routing metadata.

2. The system as recited in claim 1, wherein the one or more access requests and the one or more additional access requests are routed using a plurality of request routers, and wherein the one or more memories store additional computer-executable instructions that, when executed, cause the one or more processors to:
   propagate the updated routing metadata to the plurality of request routers.

3. The system as recited in claim 1, wherein the one or more memories store additional computer-executable instructions that, when executed, cause the one or more processors to:
   store a restored version of the table based at least in part on a table restore, wherein the restored version of the table is associated with a third client-facing table name and a second internal table identifier;
   generate further updated routing metadata representing an exchange of the second client-facing table name and the third client-facing table name, wherein the further updated routing metadata comprises a mapping of the third client-facing table name to the internal table identifier and the mapping of the internal table identifier to the one or more partitions associated with the table, and wherein the further updated routing metadata comprises a mapping of the second client-facing table name to the second internal table identifier and a mapping of the second internal table identifier to one or more partitions associated with the restored version of the table;
   receive, from the client application, one or more further access requests indicating the second client-facing table name; and
   route the one or more further access requests to the one or more partitions associated with the restored version of the table based at least in part on the further updated routing metadata.

4. The system as recited in claim 1, wherein at least a portion of the one or more access requests are routed based at least in part on the routing metadata concurrently with at least a portion of the one or more additional access requests routed based at least in part on the updated routing metadata.

5. A method, comprising:
   receiving, by a database management system, a table rename request for a table associated with a first table name, wherein routing metadata comprises a mapping of the first table name to a table identifier and a mapping of the table identifier to one or more partitions, and wherein the table rename request indicates a second table name for the table;
   generating, by the database management system, updated routing metadata responsive to the table rename request, wherein the updated routing metadata comprises a mapping of the second table name to the table identifier and the mapping of the table identifier to the one or more partitions;

receiving, by the database management system from a client application, one or more access requests indicating the second table name; and routing, by the database management system, the one or more access requests to the one or more partitions based at least in part on the updated routing metadata.

6. The method as recited in claim 5, wherein the one or more access requests are routed using a plurality of request routers, and wherein the method further comprises:

propagating, by the database management system, the updated routing metadata to the plurality of request routers.

7. The method as recited in claim 5, further comprising:

receiving, by the database management system from the client application, one or more additional access requests indicating the first table name; and routing, by the database management system, the one or more additional access requests to the one or more partitions based at least in part on the routing metadata, wherein at least a portion of the one or more access requests are routed concurrently with at least a portion of the one or more additional access requests.

8. The method as recited in claim 5, further comprising:

storing, by the database management system, a restored version of the table using one or more additional partitions, wherein the restored version of the table is associated with a third table name and a second table identifier;

generating, by the database management system, further updated routing metadata representing an exchange of the second table name and the third table name, wherein the further updated routing metadata comprises a mapping of the third table name to the table identifier and the mapping of the table identifier to the one or more partitions, and wherein the further updated routing metadata comprises a mapping of the second table name to the second table identifier and a mapping of the second table identifier to the one or more additional partitions;

receiving, by the database management system from the client application, one or more additional access requests indicating the second table name; and routing, by the database management system, the one or more additional access requests to the one or more additional partitions based at least in part on the further updated routing metadata.

9. The method as recited in claim 8, wherein the second table name and the third table name are exchanged in the further updated routing metadata using an atomic operation.

10. The method as recited in claim 8, wherein a version number of the table is increased responsive to a name change for the table.

11. The method as recited in claim 10, wherein the one or more access requests and the one or more additional access requests are routed using one or more request routers, wherein the one or more partitions and the one or more additional partitions are stored using one or more storage nodes, and wherein the one or more additional access requests are accepted or rejected at the one or more storage nodes based at least in part on a comparison between a version number of the table stored at the one or more request routers and a version number of the table stored at the one or more storage nodes.

12. The method as recited in claim 5, wherein the one or more partitions are stored using a plurality of storage nodes, wherein the plurality of storage nodes store the routing metadata using cache memories, and wherein the method further comprises:

propagating, by the database management system, the updated routing metadata to the cache memories at the plurality of storage nodes.

13. The method as recited in claim 5, further comprising:

changing, by the database management system, the first table name to the second table name in one or more database backups.

14. One or more non-transitory computer-readable storage media storing program instructions that, when executed on or across one or more processors, perform:

storing a restored version of a table in a database management system, wherein routing metadata comprises a mapping of a first table name to a first table identifier and a mapping of the first table identifier to a first one or more partitions storing an unrestored version of the table, and wherein the routing metadata comprises a mapping of a second table name to a second table identifier and a mapping of the second table identifier to a second one or more partitions storing the restored version of the table;

generating updated routing metadata representing an exchange of the first table name and the second table name, wherein the updated routing metadata comprises a mapping of the second table name to the first table identifier and the mapping of the first table identifier to the first one or more partitions storing the unrestored version of the table, and wherein the updated routing metadata comprises a mapping of the first table name to the second table identifier and the mapping of the second table identifier to the second one or more partitions storing the restored version of the table;

receiving, from a client application, one or more access requests indicating the first table name; and routing the one or more access requests to the second one or more partitions storing the restored version of the table based at least in part on the further updated routing metadata.

15. The one or more non-transitory computer-readable storage media as recited in claim 14, further comprising additional program instructions that, when executed on or across the one or more processors, perform:

propagating the updated routing metadata to a plurality of request routers configured to route the one or more access requests.

16. The one or more non-transitory computer-readable storage media as recited in claim 14, wherein the first table name and the second table name are exchanged in the updated routing metadata using an atomic operation.

17. The one or more non-transitory computer-readable storage media as recited in claim 14, wherein a version number of the table is increased responsive to a name change for the table.

18. The one or more non-transitory computer-readable storage media as recited in claim 17, wherein the one or more access requests are routed using one or more request routers, wherein the first one or more partitions and the second one or more partitions are stored using one or more storage nodes, and wherein the one or more access requests are accepted or rejected at the one or more storage nodes based at least in part on a comparison between a version number of the table stored at the one or more request routers and a version number of the table stored at the one or more storage nodes.

19. The one or more non-transitory computer-readable storage media as recited in claim 14, further comprising additional program instructions that, when executed on or across the one or more processors, perform:
 exchanging the first table name and the second table name in one or more database backups.

20. The one or more non-transitory computer-readable storage media as recited in claim 14, further comprising additional program instructions that, when executed on or across the one or more processors, perform:
 exchanging the first table name and the second table name in one or more services external to the database management system.

\* \* \* \* \*